United States Patent Office 3,317,458
Patented May 2, 1967

3,317,458
MIXTURE OF CARBON BLACK AND LIGHT FILLER AQUEOUS SUSPENSION ADDED TO RUBBER LATEX
Willi Clas, Bonn (Rhine), Johannes Pochert, Wesseling, near Cologne, and Gerd Roderburg, Bad Godesberg, Germany, assignors to Deutsche Gold- und Silber-Scheideanstalt vormals Roessler, Frankfurt am Main, Germany
No Drawing. Filed Oct. 7, 1963, Ser. No. 314,495
4 Claims. (Cl. 260—41.5)

The present invention relates to a process for the production of vulcanizable premixtures which are also known as "masterbatches" which in addition to natural or synthetic rubber or rubber-like elastomers, such as polybutadiene or polyisoprene or other vulcanizable analogous polymers or copolymers contain carbon black and light reenforcing fillers or essentially consist of such components.

The so-called "black-white mixtures" of carbon black and highly active reenforcing silicon dioxide when employed in the production of tires and shoe soles yield products with good technical rubber properties. A high degree of filling can be achieved with such filler mixtures without detrimentally affecting the properties of the elastomer concerned and often even an improvement in the mechanical and technical rubber properties is achieved. The incorporation of the filler components, that is, the carbon black on one hand and the highly active silicon dioxide and/or silicate on the other hand, provides certain difficulties in the production of the premixtures or masterbatches, as, when such fillers are mixed in dry, there always is the danger of inexact dosing because of separation or segregation of the components in the filler mixture, especially when the carbon black is used in the usual granulated form. Under these circumstances the reproducibility of mixtures with regard to their properties leaves much to be desired, aside from the fact that an incomplete distribution of the components with respect to each other in itself leads to reduction in the technical rubber property values attained. Also, the dusting of the finely divided fillers when mixed in dry is an additional disadvantage in the processing and handling of such mixtures.

According to the invention it was found that the disadvantages and difficulties indicated above can be avoided successfully in a simple way while simultaneously improving the technical rubber properties and their reproducibility, if the silicon dioxide and/or the silicate, that is, the light components of the filler, is mixed in the form of an aqueous suspension with a latex of the elastomer and the carbon black also mixed with such latex in any desired form whether it be dry or also as an aqueous suspension and the latex is then coagulated or coprecipitated in the presence of such fillers. Especially good premixtures are obtained if the carbon black and the aqueous suspension of the light filler component are mixed before admixture with the elastomer latex. In this instance also the carbon black may be admixed with the aqueous light filler suspension in dry form or in the form of an aqueous suspension.

A number of variations can be effected in the process according to the inveintion. For example, one can, as indicated above, mix dry powdered carbon black with an aqueous suspension of a precipitated, usually amorphous, silicon dioxide and mix such preliminary mixture with the latex. On the other hand, the carbon black can first be mixed with water to form a pasty suspension and then be added with the suspension of the light filler component simultaneously or sequentially to the latex while stirring.

According to a very advantageous embodiment of the invention the carbon black either in dry form or in the form of a suspension is introduced into an aqueous water glass solution while stirring and silicon dioxide is precipitated in finely divided amorphous active form from the resultant suspension in a known manner with the aid of mineral acids or acid salts whereby the silicon dioxide preferentially precipitates upon the carbon black particles. Such a suspension of both filler components after washing with water and decanting repeatedly is then added to the latex of the elastomer and the latex subsequently coagulated in the usual manner. This embodiment is particularly advantageous as an especially intimate and homogeneous mixture is achieved thereby. The coagulation of the latex of the elastomer to which the fillers have been admixed, as indicated above, insures an optimum dispersion of the fillers also in the organic phase.

The ratio of the total quantity of fillers to the dry substance content of the elastomer can vary within wide limits and preferably lies between 20:80 and 80:20 by weight. In general a total of 50 to 100 parts by weight of fillers is used per 100 parts by weight of elastomer.

The ratio of carbon black to light filler, that is, highly active reenforcing silicon dioxide and/or silicates, preferably is between 2:1 and 5:1 by weight.

Optionally, known plasticizers, such as, for example, mineral oil, resins, fats or waxes, can be incorporated in preliminary mixtures before the coagulation of the latex in order to influence the properties as well as improve the processing of the composition. Such plasticizers can, for example, be added in quantities of up to 50 parts by weight per 100 parts by weight of the dry substance content in the latex of the elastomer concerned.

Whereas considerably shearing forces were required in the dispersion of highly active fillers in dry form, above all, in synthetic elastomers or in polymers of low viscosity or polymers extended with oil, even when granulated products were used, in order to effect the wetting of the large surfaced filler particles, which high shearing forces are not even available at low viscosities, the process according to the invention renders it possible to achieve such dispersion considerably more easily and better so that the properties of the masterbatches or the vulcanizates produced therefrom can be noticeably improved. In addition, the carbon black and silicon dioxide and/or silicate can be dosed exactly and furthermore the coagulation of the latex in the presence of the fillers causes the mixing ratio of filler to elastomer always to remain unchanged. As already indicated, the admixing of the fillers with the elastomer is not only easier according to the invention but also the masterbatches produced are uniform, reproducible and dependable. Dust formation can be eliminated entirely. In contrast to the use of granulated fillers produced by wet methods, the relatively high outlays for the evaporation of the water from the granulates are avoided as the suspension liquid employed according to the invention can easily be removed mechanically by filtration to a far-reaching extent after the coagulation.

*Example 1*

Black-white pre-mixture, consisting of 100 parts of a 22% "cold rubber"
15 parts of silicic acid
35 parts of carbon black (BET-surface 20.5 m.$^2$/g.) ("Durex O"=trademark of Degussa)

6.3 liters acidic suspension of silicic acid (48 g./l.) are adjusted to a pH 5 with aqueous ammonia. 2.3 kg. carbon black paste, consisting of 700 g. carbon black powder, which were pasted with 1,600 g. of water. The mixture is heated to 60° C. and then under stirring 8 kg. cold rubber latex (25% of elastomer) are added, which were mixed with 266 g. of a 10% casein-solution and 40 g. of an antioxidant based of phenol derivative (age resister, "Nonox-Ex"—trademark of ICI) for purpose of coagulation the mixture is adjusted with diluted sulfuric acid (1 part of concentrated sulfuric acid to 9 parts of water) to a pH 2. The cogulate is then filtered off, washed free of acid, and dried at 100° C. to 120° C.

*Example 2*

Black-white pre-mixture, consisting of 72.7 parts of a 22% cold rubber
27.3 parts of naphthenic oil
45 parts of carbon black (BET-surface 119 m.$^2$/g.) (Corax 6 trademark of Reguna)
15 parts of silicic acid.

7 liters of acidic precipitated suspension of silicic acid (48 g./l.) are adjusted to a pH 5 with aqueous ammonia. Then 4 kg. carbon black paste, consisting of 1,000 g. carbon black (Corax 6), which were pasted with 3,000 g. of water and 546 g. of a naphthenic oil are added as a filler. The receiver is heated to 60° C. 6 kg. cold rubber latex (25%) are now added under stirring, which contains as age resister 29 g. of an antioxidant based of phenol derivative Nonox-Ex and 200 g. of a casein solution. For the coagulation the mixture is adjusted to pH 2 with diluted sulfuric acid.

*Example 3*

Black-white pre-mixture by coprecipitation from waterglass solution.

2 kg. of water-glass solution of the specific weight 1.33 (with 26% SiO$_2$ and a molecular ratio 1 NaO$_2$ to 3.4 SiO$_2$) are diluted with 2 kg. of water. Thereto are added under excessive stirring 3,400 g. carbon black, which are made pasty with 7,700 g. water. The precipitation of the silicic acid takes place with 420 ccm., sulfuric acid 50% diluted with 4,000 ccm. water at 80° C. under stirring up to pH 2. Into the acidic suspension 32,000 g. of cold rubber latex (25%) are introduced, which has been stabilized under stirring at 60° C. within 10 minutes against acid with 2%, related to the elastomer of a nonionic emulgator (Fettsäurepolyäthylenoxydcondensationsproduks). The coagulate is filtered off, washed free of electrolyte and dried at 100° C. to 120° C. A so-called batch with 100 parts of elastomer and 50 parts of filler is obtained, which consists of 85% carbon black and 15% silicic acid.

We claim:

1. A process for the production of a vulcanizable premixture essentially consisting of a vulcanizable elastomer, carbon black and a light reenforcing filler component selected from the group consisting of finely divided reenforcing silicon dioxide, finely divided reenforcing silicates and mixtures thereof which comprises admixing carbon black and the light filler component with a latex of the elastomer, the carbon black and light filler component being admixed with such latex in the form of an aqueous suspension of a mixture of the carbon black and the light filler component, the total quantity of carbon black and light filler component admixed with the elastomer latex being such as to provide a ratio of carbon black and light filler component to dry elastomer substance content of the latex between 20:80 and 80:20 by weight, the ratio of carbon black to light filler component being between 2:1 and 5:1 by weight, and coagulating the latex in the presence of such admixed carbon black and light filler component.

2. The process of claim 1 in which 50 to 100 parts by weight of the total weight of the carbon black and light filler component are employed per 100 parts by weight of dry elastomer substance content of the latex.

3. The process of claim 1 in which said mixture of carbon black and the light filler component is prepared by precipitating amorphous finely divided silicon dioxide from an aqueous water glass solution having carbon black suspended therein and washing the resulting suspension of carbon black and precipitated silicon dioxide.

4. The process of claim 1 comprising in addition admixing with said latex prior to coagulation thereof up to 50 parts by weight of a plasticizer for the elastomer per 100 parts by weight of the dry elastomer substance content of said latex.

References Cited by the Examiner

UNITED STATES PATENTS

| | | | |
|---|---|---|---|
| 2,229,534 | 1/1941 | Walton | 260—821 |
| 2,597,872 | 5/1952 | Iler | 260—29.6 |

FOREIGN PATENTS

| | | |
|---|---|---|
| 158,769 | 9/1954 | Australia. |
| 768,074 | 2/1957 | Great Britain. |

MORRIS LIEBMAN, *Primary Examiner.*

J. H. DERRINGTON, *Assistant Examiner.*